B. HOLLY.
STREET MAINS OR PIPES FOR SUPPLYING LARGE DISTRICTS
WITH HEAT FOR WARMING BUILDINGS.

No. 193,088. Patented July 17, 1877.

UNITED STATES PATENT OFFICE.

BIRDSILL HOLLY, OF LOCKPORT, NEW YORK.

IMPROVEMENT IN STREET MAINS OR PIPES FOR SUPPLYING LARGE DISTRICTS WITH HEAT FOR WARMING BUILDINGS.

Specification forming part of Letters Patent No. 193,088, dated July 17, 1877; application filed May 14, 1877.

CASE C.

*To all whom it may concern:*

Be it known that I, BIRDSILL HOLLY, of Lockport, in the county of Niagara and State of New York, have invented a new and useful Improvement in Street Mains or Pipes for Supplying Large Districts with Heat for Warming Dwellings, and other purposes; and I do hereby declare that the following is a full, clear, and exact description of the same, reference being had to the accompanying drawings, forming part of this specification, in which—

Figure 1:
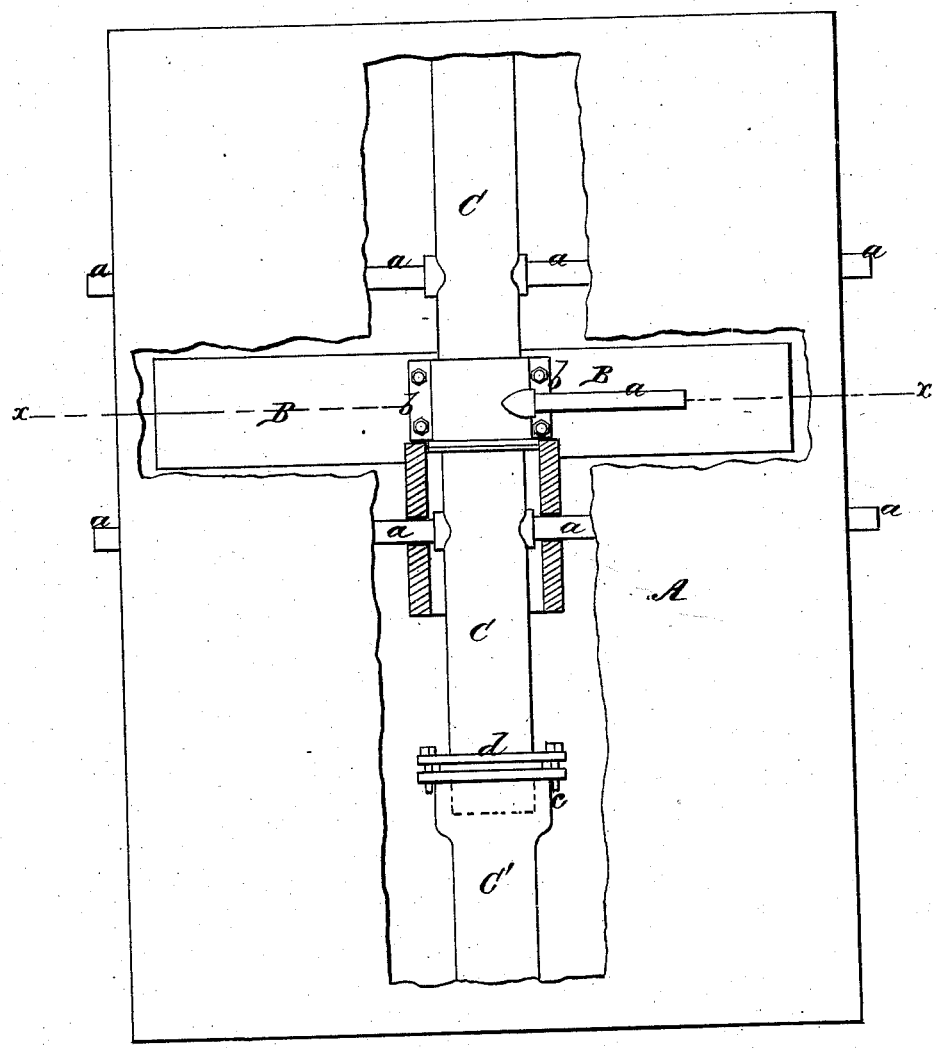
Figure 2:
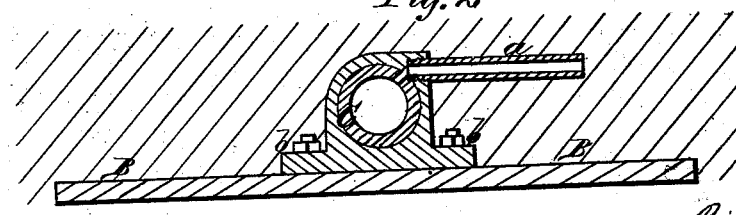

Figure 1 is a top view of portions of a street-main, with service-pipes constructed and laid down in accordance with my invention. Fig. 2 is a transverse section of the same.

The street-mains and service-pipes which I shall hereinafter describe are specially for use in connection with a new mode of construction of apparatus for supplying large districts of dwellings with heat for warming and other useful purposes, for which I have filed an application for a patent at even date with this, which application is designated "Case A."

The nature of my invention consists in a new mode of construction of and laying underground street steam-mains and their service-pipes, whereby the sections of the said mains are kept stationary at points between their two ends, and near the points where the service-pipes connect with them, and are allowed perfect freedom to expand and slip steam-tight one within the other at points beyond where the service-pipes extend out to the dwellings.

Let A in the accompanying drawings be supposed to represent a foundation for sustaining the parts now to be described. B is a strong saddle, firmly sustained by its lateral portions being projected out into the earth and made secure by the use of water, lime, cement, and pounded stone. C C' are sections of a street steam-main pipe, provided with service-pipes $a$ $a$, near the saddle B. The section C of the main pipe is firmly supported and bolted to the saddle B, as indicated at $b$. Each section C of the main pipe being, say, about one hundred feet long, there will be about fifty feet of main pipe on each side of the saddle, and the longitudinal expansion and consequent movement of these fifty feet of metal pipe must not be restrained on either side of the saddle, and to provide for this movement without any leakage taking place, the respective ends of the section of pipe which is bolted to the saddle are inserted for some considerable distance into enlarged ends $c$ of the other sections C' of the main, and made steam-tight by a ring of packing pressed upon by a screw-follower, as shown, or in any other proper manner.

Under this mode of construction of and laying main pipes and their service-pipes for steam warming apparatus, the expansion near the saddle will be so slight that the service-pipes $a$ $a$ will not be materially deflected from a right angle with the main, and the aggregated expansion on each side of the saddle will lengthen the pipe, say, about one or two inches, and this increased length will be received in the enlarged packed ends of the section C', and thus the expansion is permitted, and bodily movement of the main pipes and their service-pipes prevented by the strong and permanently-seated saddle.

In laying down the street steam-mains, I follow the same mode as described in my application A, herein referred to, of covering these mains, for the purpose of preventing undue condensation and loss of steam after it leaves the boiler and in its travel to the dwellings to be heated. And at necessary or convenient points accessible junction-boxes will be provided, for the purpose of getting at such valves or cocks of the service-pipes as may be used.

Having described my invention, what I claim, and desire to secure by Letters Patent, is—

In combination with steam-tight slip-jointed sections of a street-main, saddles placed near the middle of their length, for confining the respective sections from longitudinal displacement at or near the points where the service-pipes leading from the mains are located, and thereby preventing very great lateral deflection of said service-pipes, substantially as herein set forth.

Witness my hand in the matter of my application for a patent for an improvement in street mains or pipes for supplying large districts with heat for warming dwellings and other purposes, this 21st day of April, A. D. 1877.

BIRDSILL HOLLY.

Witnesses:
 SAML. ROGERS,
 I. H. BABCOCK.